United States Patent
Herbert et al.

(10) Patent No.: US 6,376,088 B1
(45) Date of Patent: Apr. 23, 2002

(54) NON-MAGNETIC PHOTORECEPTOR SUBSTRATE AND METHOD OF MAKING A NON-MAGNETIC PHOTORECEPTOR SUBSTRATE

(75) Inventors: William G. Herbert, Williamson; James E. McNamara, Sodus; Gary J. Maier, Webster, all of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/449,343

(22) Filed: Nov. 24, 1999

(51) Int. Cl.$^7$ .................... B32B 1/08; B32B 15/08; C25D 1/02; G03G 15/09
(52) U.S. Cl. ................ 428/457; 428/935; 205/73; 399/276
(58) Field of Search ................ 428/606, 586, 428/680, 935, 457; 205/73, 76, 77; 399/276

(56) References Cited

U.S. PATENT DOCUMENTS

| | | | |
|---|---|---|---|
| 3,844,906 A | 10/1974 | Bailey et al. | 204/9 |
| 4,067,782 A | 1/1978 | Bailey et al. | 204/25 |
| 4,265,990 A | 5/1981 | Stolka et al. | 430/59 |
| 4,501,646 A | 2/1985 | Herbert | 204/4 |
| 4,902,386 A | 2/1990 | Herbert et al. | 204/9 |
| 5,105,222 A * | 4/1992 | Ohta et al. | 355/211 |
| 5,781,830 A * | 7/1998 | Gaylord et al. | 399/109 |
| 5,815,773 A * | 9/1998 | Zaman | 399/117 |
| 5,890,041 A * | 3/1999 | Lewis | 399/276 |
| 6,178,306 B1 * | 1/2001 | Mizoguchi et al. | 399/276 |
| 6,201,942 B1 * | 3/2001 | Honda et al. | 399/286 |

FOREIGN PATENT DOCUMENTS

| | | | |
|---|---|---|---|
| JP | 57-70286 | * | 4/1982 |
| JP | 2-116857 | * | 5/1990 |
| JP | 11-249438 | * | 9/1999 |

* cited by examiner

Primary Examiner—John J. Zimmerman
(74) Attorney, Agent, or Firm—Oliff & Berridge, PLC

(57) ABSTRACT

A method of electroforming a non-ferromagnetic substrate for use in an electrostatographic imaging member includes electroforming a non-ferromagnetic substrate of nickel and one of phosphorus, tin and copper. The substrate can be cylindrical shaped and have a substantially constant inner diameter and outer diameter along a length of the substrate. The substrates can be used in various electrostatographic imaging members including electrographic and electrophotographic imaging members. The methods of this invention can provide seamless imaging members such as photoreceptors that can be used in apparatus that include magnetic developer systems, without adversely interacting with magnetic brushes and magnetic toners.

21 Claims, 2 Drawing Sheets

NON-MAGNETIC PHOTORECEPTOR SUBSTRATE AND METHOD OF MAKING A NON-MAGNETIC PHOTORECEPTOR SUBSTRATE

BACKGROUND OF THE INVENTION

1. Field of Invention

This invention relates to substrates for electrostatographic imaging members. This invention also relates to a method of making the substrates.

2. Discussion of Related Art

Substrates for electrostatographic imaging members including electrographic and electrophotographic imaging members have been formed by electroforming methods. For example, these methods have been used to form flexible, seamless electrostatographic substrates such as substrates for photoreceptors. Such photoreceptor substrates have been manufactured by electroforming a metallic material onto a mandrel immersed in an electrolytic bath, to produce an electroformed layer or form on the mandrel. For example, photoreceptor substrates have been formed from nickel-based materials, which provide desirable substrate properties in photoreceptors.

The forms are commonly cylindrical shaped and of a constant diameter. The forms can be removed from the mandrels by either selectively dissolving the mandrel, or by removing the form from the mandrel. To permit removal of the form from the mandrel upon cooling of the assembly, the form and mandrel can be formed of materials having different coefficients of thermal expansion. Exemplary mandrels and electroforming processes are disclosed, for example, in U.S. Pat. No. 3,844,906 to Bailey et al.; U.S. Pat. No. 4,067,782 to Bailey et al.; U.S. Pat. No. 4,501,646 to Herbert and U.S. Pat. No. 4,902,386 to Herbert et al., each incorporated herein by reference in its entirety.

Non-ferromagnetic and ferromagnetic developer systems are used in electrostatographic apparatus. Ferromagnetic developer systems include magnetic brushes and magnetic toners in single and two-component developers.

In apparatus that include ferromagnetic developer systems, it is known to form the substrate of the imaging member of a non-ferromagnetic material. Aluminum is commonly used to form such non-ferromagnetic substrates. Aluminum is also used to form substrates of electrostatographic imaging members used in apparatus including non-ferromagnetic developer systems.

Aluminum substrates are formed by extruding aluminum and honing theextrusions to the desired dimensions. Thus, secondary operations are required to achieve the desired dimensional tolerances of the aluminum substrates. In addition, the aluminum substrates are subjected to secondary operations, such as particle blasting, to achieve a desired surface finish and to cleaning steps.

SUMMARY OF THE INVENTION

As explained above, both ferromagnetic and non-ferromagnetic developer systems are known for use in electrostatographic imaging apparatus. Ferromagnetic developer systems use magnetic toners and magnetic brushes. Ferromagnetic substrates in known electrostatographic imaging members provide improved sensitivity and an improved ability to print single pixel lines.

However, the improved sensitivity that enables such fine line copying can cause a reduction in the number of discernible density levels in images. This can cause darker halftones to appear totally black. Toner consumption can also be increased, resulting in thicker images than desired. Other development latitude can also be affected by the ferromagnetic substrates. For example, bias and/or scorotron-to-photoreceptor spacing is sometimes needed to achieve good prints or copies.

The improvement in fine line development as well as the loss in development latitude is attributed to the magnetic fields that are generated by and/or impacted by the ferromagnetic substrates.

Non-ferromagnetic substrates are most commonly used in the electrostatographic imaging members. However, although the use of such known non-ferromagnetic substrates in such magnetic developer systems may provide a satisfactory solution to some of the above-described problems of ferromagnetic substrates, the known non-ferromagnetic substrates have other associated problems. As explained above, aluminum non-ferromagnetic substrates are not cost effective to produce because they require machining and finishing operations to achieve suitable dimensional tolerances and finishes to enable the substrates to be used in electrostatographic imaging members.

Electroforming methods provide important cost advantages compared to the above-described methods for forming substrates such as aluminum substrates. Particularly, electroforming can be used to form substrates having exact dimensional tolerances at a lower cost than the methods used to form such aluminum substrates. In addition, the electroformed substrates do not generally require any secondary cleaning or surface finishing operations to achieve a desired surface finish.

As stated above, electroformed nickel substrates are known for use in photoreceptor belts. However, these known nickel substrates are ferromagnetic. Accordingly, when such nickel substrates are used in combination with magnetic developer systems, the above-described problems with regard to print quality will occur.

This invention provides non-ferromagnetic substrates suitable for use in electrostatographic apparatus that include magnetic developer systems.

This invention separately provides nickel-based substrates that can be used in combination with magnetic developer systems and that do not adversely interact with such magnetic developer systems.

This invention separately provides nickel-based substrates that can be used in combination with magnetic developer systems, such that fine line development and reduced toner consumption are achieved.

This invention separately provides non-ferromagnetic substrates formed by electroforming.

This invention separately provides non-ferromagnetic substrates that are formed cost effectively and with exacting dimensional tolerances.

This invention separately provides non-ferromagnetic substrates that are electroformed using conventional electroforming techniques.

This invention separately provides processes for forming the improved non-ferromagnetic substrates.

One exemplary embodiment of the method of electroforming a non-magnetic substrate for use in an electrostatographic imaging member of this invention comprises placing a mandrel in an electroforming electrolyte in an electrolytic cell, where the electrolyte comprises nickel and one of phosphorus, tin and copper. Current is applied to activate the electrolytic cell to electroform a non-magnetic substrate comprising nickel and phosphorus, tin or copper. The substrate can be removed from the mandrel by conventional techniques such as cooling the mandrel and substrate.

One exemplary embodiment of the substrates according to the methods of this invention are cylindrical shaped and seamless. Such substrates can be used in electrostatographic imaging members including electrographic imaging members and photoreceptors. The substrates do not adversely interact with magnetic brushes and magnetic toners.

BRIEF DESCRIPTION OF THE DRAWINGS

The preferred embodiments of this invention will be described in detail, with reference to the following figures, in which.

DETAILED DESCRIPTION OF PREFERRED EMBODIMENTS

Exemplary embodiments of the substrates formed according to the methods of this invention are non-ferromagnetic. These substrates can be used to form various electrostatographic imaging members including electrographic imaging members and electrophotographic imaging members or photoreceptors.

The non-ferromagnetic substrates of this invention can be used in electrostatographic apparatus including non-magnetic, as well as magnetic, developer systems. The non-ferromagnetic substrates of this invention are particularly desirable for use in apparatus including magnetic developer systems. The non-ferromagnetic substrates of this invention do not adversely interact with such magnetic developer systems as do known nickel ferromagnetic substrates.

Figure 1:
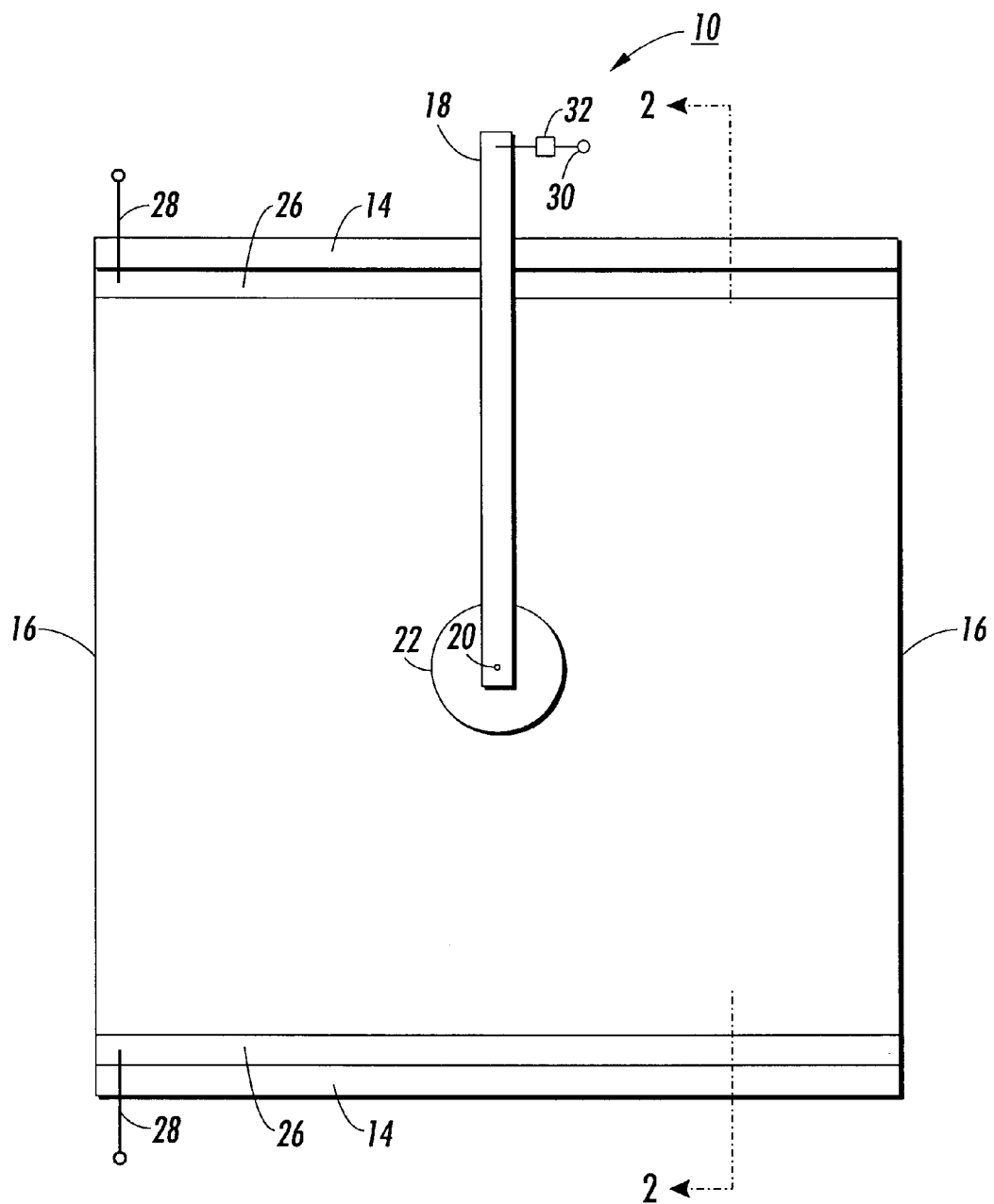
FIG. 1 is a top view of an electrolytic cell that can be used to form exemplary embodiments of non-magnetic substrates of this invention.
Figure 2:
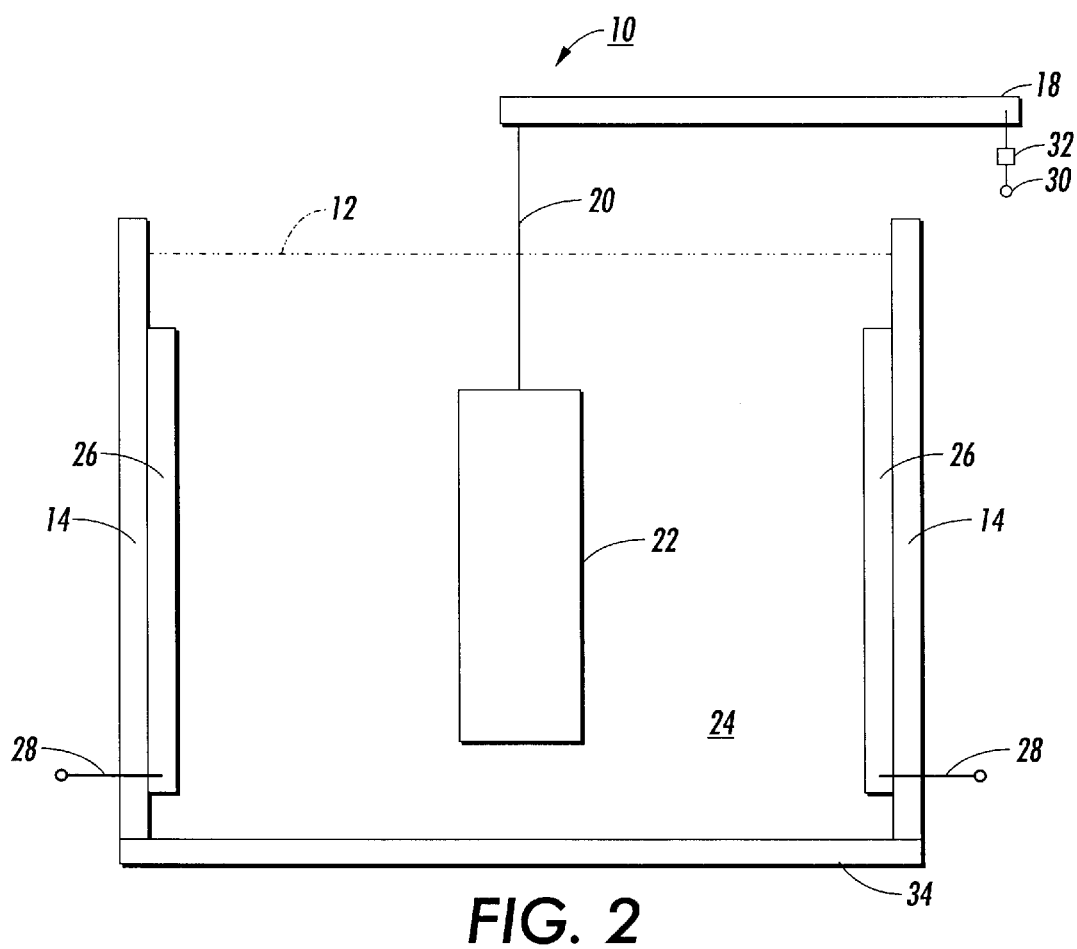
FIG. 2 is a cross-sectional view in the direction of line 2—2 of FIG. 1.

Embodiments of the electroforming methods of this invention for forming nonmagnetic substrates can be practiced using conventional electrolytic cells. FIGS. 1 and 2 illustrate a suitable apparatus 10 that can be used to practice embodiments of the methods of this invention. The apparatus 10 comprises an electrolytic cell 12 formed by the side walls 14, side walls 16 and the base 34. The apparatus also comprises a positioning mechanism that includes an arm 18 and a connector 20 attached to a mandrel 22 to suspend the mandrel 22 in the electrolytic solution 24 of the electrolytic cell 12. Anode electrodes 26 are connected to a DC power source 28 and are positioned adjacent to the side walls 14. The positioning mechanism also comprises a moving mechanism, which moves the arm 18 in horizontal and vertical directions, so as to move the mandrel 22 into and out of electrolytic solution 24. A DC power source 30 is attached to the arm 18 through a current control 32 so as to selectively make the mandrel 22 cathodic.

In exemplary embodiments of this invention, the mandrel is typically initially cleaned in a suitable cleaning solution. The cleaned mandrel can then be soaked in the electrolytic solution to raise the mandrel temperature to the temperature of the electrolytic solution. The mandrel is next exposed to the electrolytic solution while current is applied to the electrolytic cell, so that an electrodeposit or form is created on the outer surface of the mandrel. The mandrel and form are then typically rinsed in a suitable rinse solution to remove any excess electrolytic solution.

The form is then removed from the mandrel. The form is desirably separated from the mandrel without damaging the mandrel, so that the mandrel can be reused. For example, the mandrel and form can be cooled to a sufficiently low temperature to cause sufficient respective size changes of the mandrel and form so that the form can be slid off of the mandrel.

After the form is removed from the mandrel, the mandrel is typically cleaned in a suitable cleaning solution to prepare the mandrel for reuse to form additional forms by the above-described electroforming method.

Exemplary mandrels that can be used in the methods of this invention are disclosed in U.S. Pat. No. 4,902,386. One skilled in the art will readily understand that other suitable mandrel constructions can be also be used in the methods of this invention.

In exemplary embodiments of this invention, the mandrels can optionally be plated with a protective coating, depending upon the composition of the mandrel and the composition of the electrolyte solution to be deposited onto the mandrel. Typical known protective coatings for mandrels include chromium, nickel, alloys of nickel, iron and the like. The plated metal should desirably be harder than the metal used to create the form. The outer surface of the plated mandrel should also be passive, i.e., non-adhesive, relative to the metal that is to be electrodeposited to prevent adhesion during electroforming. Other relevant factors that may be considered when selecting the metal for the protective coating include cost, nucleation, adhesion, oxide formation and the like. For example, chromium plating is a desirable material for the outer mandrel surface because it has a naturally occurring oxide surface resistive to the formation of a strongly adhering bond with such electrodeposited metals as nickel. Such plating can formed by any suitable known plating technique.

Forms are electroformed on the mandrels using suitable process conditions. Exemplary embodiments of the non-ferromagnetic substrates formed by the methods of this invention comprise nickel and one of phosphorus, tin and copper. The electrolytic solutions used to the form these substrates having compositions with different amounts of nickel and phosphorus, tin or copper have suitable compositions to achieve a desired substrate composition by electroforming.

Electrolytic solutions for electroforming substrates that comprise nickel and phosphorus can comprise nickel sulfate, phosphoric acid, sodium sulfate, and an additive for stress relief. A wetting agent to enhance wetting of the mandrel by the electrolytic solution can also be added to the electrolytic solution.

The amounts of nickel sulfate and phosphoric acid in the electrolytic solution are selected to result in forms comprising nickel and from about 10 wt % to about 25 wt % of phosphorous. Forms having such compositions of nickel and phosphorous are non-ferromagnetic.

Electrolytic solutions for electroforming substrates that comprise nickel and tin can comprise, for example, tin chloride, nickel sulfate, nickel chloride and boric acid. Boric acid is added for pH control. A suitable additive for stress relief and a wetting agent can also be added to the electrolytic solution.

The respective amounts of nickel sulfate, nickel chloride and tin chloride in the electrolytic solution are selected to produce forms comprising nickel and an effective amount of tin to make the forms non-ferromagnetic.

Electrolytic solutions for electroforming substrates that comprise nickel and copper can comprise, for example, copper sulfate, nickel sulfate or copper chloride, nickel chloride and boric acid. A suitable additive for stress relief and a wetting agent can also be added to the electrolytic solution.

The respective amounts of copper sulfate, nickel sulfate or copper chloride and nickel chloride in the electrolytic solution are selected to result in forms comprising nickel and an effective amount of copper to make the forms non-ferromagnetic.

In order to control the deposition of copper, which preferentially deposits from the electrolytic solution relative to nickel, the current density, temperature and nickel:copper ratio, of the electrolytic solution are controlled to prevent excessive deposition of copper.

Other relevant parameters for the electroforming of forms comprising nickel and phosphorous, tin or copper that are provided by the methods of this invention, also include the electrolyte temperature, the electrolyte pH and the current density level applied. It is also desirable to agitate the electrolytic solution to ensure that the mandrel is uniformly coated so that the resulting substrate have a uniform thickness.

Electrochemical processes for electroforming articles on mandrels are also well known and described in the art. For example, electroforming and electrodeposition processes are disclosed in U.S. Pat. Nos. 3,844,906; 4,067,782, 4,501,646, and 4,902,386. For example, U.S. Pat. No. 3,844,906 discloses an electroplating process which may be used to form seamless nickel belts by electrolytically depositing nickel from solution onto a support mandrel, and then recovering the nickel belt by cooling the nickel-plated mandrel and removing the electroform.

As stated above, the form can alternatively be separated from the mandrel by dissolving the mandrel. This selective dissolution can be achieved by placing the mandrel and form in a solution that selectively dissolves the mandrel composition, but substantially does not dissolve the form.

In exemplary embodiments of this invention, the mandrel 22 is suspended vertically in the electrolytic solution 24. Selected portions of the mandrel 22 may be masked off with a suitable non-conductive material, such as wax, to prevent deposition on those areas. The electrolytic solution 24 is is maintained at the desired temperature. The mandrel 22, attached to the arm 18, is immersed in the electrolytic solution 24, typically parallel to the orientation of the anodes 26.

The positive end of the DC power source 28 may be connected to the anodes 26 and the negative end of the DC power source 30 may be connected to the arm 18. The electroplating current passes from the DC power source 28 to the anodes 26, to the electrolytic solution 24, to the mandrel 22, to the arm 18, and back to the DC power source 30. In operation, the mandrel 22 is lowered into the electrolytic solution 24 and a layer of electroformed metal, such as nickel/phosphorous, nickel/tin or nickel/copper, is deposited on the mandrel 22. The mandrel 22 can be rotated about its vertical axis while immersed in the electrolytic solution to enhance coating uniformity on the mandrel 22. When the layer of deposited metal has reached the desired thickness, the mandrel 22 is removed from the electrolytic solution 24 and processing of the form is completed, such as by rinsing, cooling and removal of the form from the mandrel 22.

In the electrolytic cell 12, the anodes 26 can have any suitable width. Although the height of the anodes 26 is not particularly limited, the anodes 26 are desirably at least about as tall as the portion of the mandrel 22 to be electroplated, so that an even electroform layer is formed on the mandrel 22.

The shape of the electrolytic cell 12 is not limited to any specific cell geometry. Square, rectangular or like geometries are suitable to permit the electrodeposition of a layer of uniform thickness onto the mandrel 22. The size of the electrolytic cell 12 is generally related to the size of the mandrel 22 to be plated. Generally, the width of the electrolytic cell 12 should be between about 4–12 times the diameter of the mandrel 22, and the length of the electrolytic cell 12 should also be from about 4–12 times the length of the mandrel 22. For example, if the mandrel 22 is circular as shown, the diameter is the outer diameter; if the mandrel 22 is elliptical, the diameter is length of the major axis of the ellipse.

It will be understood by those skilled in the art that deposited layer thickness on the mandrel 22 can be selectively varied depending on the intended use and requirements of the form.

When the mandrel is present in the electrolytic cell and electrodeposition is to be conducted, the electrolyte solution is preferably agitated to ensure that the mandrel surface is constantly exposed to new electrolyte solution. Such agitation may be conducted, for example, by stirring, air sparging or solution flow.

The current control 32 can be used to reduce, down to zero, if desired, the current which passes to the mandrel 22 to make the mandrel 22 cathodic. The current control 32 allows the electroforming process of the mandrel 22 to be adjusted based upon such factors as the specific form being formed and the desired thickness of the form. Such current control can be utilized to interrupt current flow to the mandrel 22 in such other steps as rinsing, soaking, and removal of the form from the mandrel 22.

Figure 3:
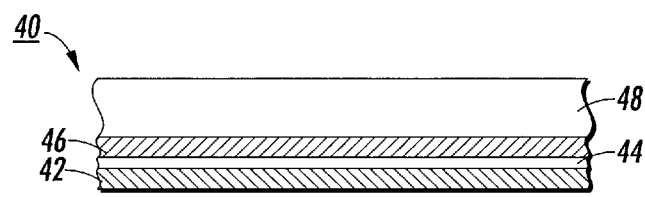
FIG. 3 illustrates a photoreceptor that comprises a substrate formed according to an exemplary embodiment of the method of this invention.

As stated above, the forms that are formed by exemplary embodiment of the methods of this invention can be used as a substrate in various electrostatographic imaging members. These imaging members can be electrographic imaging members or electrophotographic imaging members or photoreceptors. FIG. 3 illustrates an exemplary embodiment of a photoreceptor 40 that can be formed using the non-ferromagnetic substrates formed according to the methods of this invention. The photoreceptor 40 comprises a substrate 42 and a plurality of imaging layers 44–48 formed over the substrate 40. The layers 44–48 include charge carrier blocking layer 44 to prevent the injection of charge carriers from the substrate 42 into the overlying charge generating layer 46 and charge transport layer 48. The layers 44–48 can be formed by any conventional techniques, such as those disclosed in U.S. Pat. No. 4,265,990, incorporated herein by reference in its entirety.

Electrographic imaging members can also be formed using the non-ferromagnetic substrates according to this invention. These electrographic imaging members can typically comprise a charge blocking layer and an imaging layer formed over the substrate.

It will be understood by those skilled in the art that the electrostatographic imaging members formed using the substrates according to this invention can have various layer configurations and compositions formed over the substrates.

The electrostatographic imaging members such as the photoreceptor 40 that can be formed using the forms electroformed according to methods of this invention can have various shapes and sizes and can be continuous (seamless) or non-continuous. The forms that are electroformed using the cylindrical mandrel 22 are cylindrical shaped and can have a substantially constant inner and outer diameter. It will be understood by those skilled in the art that the forms can also have diameters that vary along the length of the form.

While this invention has been described in conjunction with specific embodiments described above, it is evident that many alternatives, modifications and variations are apparent to those skilled in the art. Accordingly, the preferred embodiments of this invention as set forth above are intended to be illustrative and not limiting. Various changes can be made without departing from the spirit and scope of this invention.

What is claimed is:

1. An electrostatographic imaging member, comprising:
   a non-ferromagnetic substrate comprising nickel and one of phosphorus, tin and copper; and
   a plurality of imaging layers over the non-ferromagnetic substrate.

2. The electrostatographic imaging member of claim 1, wherein the electrostatographic imaging member is a photoreceptor.

3. The electrostatographic imaging member of claim 2, wherein the photoreceptor comprises a seamless belt.

4. The electrostatographic imaging member of claim 1, wherein the substrate comprises nickel and an effective amount of tin to make the substrate non-ferromagnetic.

5. The electrostatographic imaging member of claim 1, wherein the substrate comprises nickel and an effective amount of copper to make the substrate non-ferromagnetic.

6. The electrostatographic imaging member of claim 1, wherein the imaging layers comprise:
   a charge blocking layer formed over the substrate;
   a charge generating layer formed over the charge blocking layer; and
   a charge transport layer formed over the charge generating layer.

7. The electrostatographic imaging member of claim 6, wherein the substrate comprises nickel and one of (i) an effective amount of tin to make the substrate non-ferromagnetic and (ii) an effective amount of copper to make the substrate non-ferromagnetic.

8. A method of making a photoreceptor, comprising:
   placing a mandrel in an electroforming electrolyte in an electrolytic cell, the electroforming electrolyte comprising nickel and one of phosphorus, tin and copper;
   activating current to the electrolytic cell;
   electroforming a non-ferromagnetic substrate comprising nickel and one of phosphorus, tin and copper on the mandrel;
   removing the substrate from the mandrel; and
   forming a plurality of imaging layers over the non-ferromagnetic substrate to form a photoreceptor.

9. The method of claim 8, wherein the imaging layers comprise:
   a charge blocking layer formed over the substrate;
   a charge generating layer formed over the charge blocking layer; and
   a charge transport layer formed over the charge generating layer.

10. The method of claim 9, wherein the substrate comprises nickel and one of (i) an effective amount of tin to make the substrate non-ferromagnetic and (ii) an effective amount of copper to make the substrate non-ferromagnetic.

11. The method of claim 8, wherein the substrate is cylindrical shaped and has a substantially constant inner diameter and outer diameter along a length of the substrate.

12. The method of claim 8, wherein the substrate comprises nickel and from about 10 wt % to about 25 wt % phosphorus.

13. The method of claim 8, wherein the substrate comprises nickel and an effective amount of tin to make the substrate non-ferromagnetic.

14. The method of claim 8, wherein the substrate comprises nickel and an effective amount of copper to make the substrate non-ferromagnetic.

15. A method of making a photoreceptor in the form of a seamless belt, comprising:
   placing a mandrel in an electroforming electrolyte in an electrolytic cell, the electroforming electrolyte comprising nickel and one of phosphorus, tin and copper;
   activating current to the electrolytic cell;
   electroforming a non-ferromagnetic substrate comprising nickel and one of phosphorus, tin and copper on the mandrel;
   removing the substrate from the mandrel; and
   forming a plurality of imaging layers over the non-ferromagnetic substrate to form the photoreceptor, the photoreceptor having a seamless belt configuration.

16. The method of claim 15, wherein the substrate is cylindrical shaped and has a substantially constant inner diameter and outer diameter along a length of the substrate.

17. The method of claim 15, wherein the substrate comprises nickel and from about 10 wt % to about 25 wt % phosphorus.

18. The method of claim 15, wherein the substrate comprises nickel and an effective amount of tin to make the substrate non-ferromagnetic.

19. The method of claim 15, wherein the substrate comprises nickel and an effective amount of copper to make the substrate non-ferromagnetic.

20. The method of claim 15, wherein the imaging layers comprise:
   a charge blocking layer formed over the substrate;
   a charge generating layer formed over the charge blocking layer; and
   a charge transport layer formed over the charge generating layer.

21. The method of claim 20, wherein the substrate comprises nickel and one of (i) an effective amount of tin to make the substrate non-ferromagnetic and (ii) an effective amount of copper to make the substrate non-ferromagnetic.

* * * * *